Aug. 23, 1932.  E. W. KELLOGG  1,872,965
TRANSLATING APPARATUS EMPLOYING REFLECTED LIGHT
Filed May 22, 1930
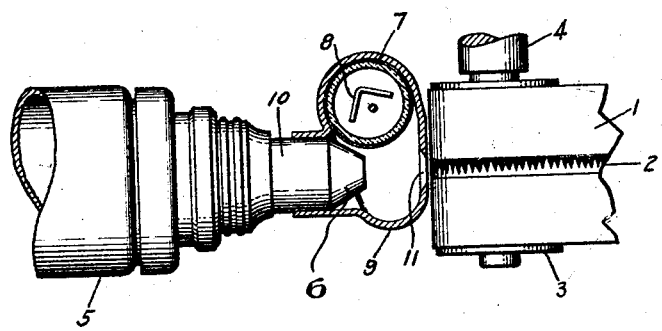
Inventor:
Edward W Kellogg,
by Charles E. Tullar
His Attorney.

Patented Aug. 23, 1932

1,872,965

UNITED STATES PATENT OFFICE

EDWARD W. KELLOGG, OF MOORESTOWN, NEW JERSEY, ASSIGNOR TO GENERAL ELECTRIC COMPANY, A CORPORATION OF NEW YORK

TRANSLATING APPARATUS EMPLOYING REFLECTED LIGHT

Application filed May 22, 1930. Serial No. 454,802.

My invention relates to apparatus for translating the variations in light reflected from successive unit areas of a surface into electrical variations.

It relates particularly to apparatus by which a light reflecting sound record may be translated into current variation adapted for use in the reproduction of the recorded sound.

In the reproduction of sound from a sound record by means of light, the form of record now in common use is one of variable transparency through which light is caused to pass in a narrow beam to a photo-electric cell. Various attempts have been made to employ an opaque sound record and to cause the variable light reflected from the opaque record to operate a photo-electric cell. The chief difficulty encountered in making such attempts has been that of obtaining a sufficient amount of light from the record to operate the cell without excessive amplification of the variable current obtained therefrom. The reason for this is that the optical system by which the sound record is illuminated, necessarily occupies a position immediately in front of the illuminated area, and not only itself receives a considerable fraction of the light which is reflected from the record, but forms an obstruction which makes it practically impossible to place the photo-electric cell in close enough proximity to the record to receive an adequate fraction of the remainder of the reflected light.

It has been proposed as shown for example by British Patent No. 305,625, to surround the illuminated portion of the record by a curved, specularly reflecting or mirror surface, all parts of which are arranged at such angles that they reflect the light from the record directly into the light sensitive device. Such a construction requires a high degree of precision in the shape of the reflecting surface and involves a considerable loss in light for even the best known mirrors absorb about from 15 to 20 percent of the incident light.

It is the purpose of my invention to take advantage of the extremely high reflecting power of certain white pigments, for example magnesium carbonate, which reflect from 95 to 98 percent of the incident light. In other words much higher coefficients of reflection are obtainable with diffusely reflecting surfaces than with specularly reflecting surfaces.

I also take advantage of the well known fact that if light is emitted in an enclosure whose walls have very small absorption, any dark colored or absorbing area introduced into the enclosure, even though the dark area be a small fraction of the total wall area, will receive practically all of the energy emitted by the light source. In the embodiment of my invention the light sensitive cell constitutes the said absorbing area in an enclosure which surrounds the illuminated portion of the record, all parts possible of the enclosing surface being painted with a very highly reflecting white pigment.

My invention will be better understood from the following description taken in connection with the accompanying drawing, and its scope will be pointed out in the appended claims.

Referring to the drawing, the single figure of which illustrates one form of apparatus embodying my invention, an opaque flexible strip is shown at 1 bearing a sound record 2 of the variable width type, one side of the record being shown as black or non-reflecting and the other side being white or highly reflecting. The strip is supported by the roller or drum 3 mounted on the shaft 4 by which it is rotated at a uniform speed. At 5 I have shown a portion of an optical system of well known construction for projecting a light beam upon the record portion of the strip such that the strip is illuminated only in a narrow band which extends transversely to the motion thereof. Best results in sound reproduction are obtained when the band of illumination is of the order of one one-thousandth of an inch or even less than that value. Adjacent the tapered end portion 6 of the system 5 is the photo-electric cell 7 whose window faces the sound record and in the form of apparatus illustrated the light sensitive area or cathode 8 preferably subtends as large an angle, as viewed from the record, as is practicable. Between the cell and the record strip is the enclosing member 9 which surrounds that part of the record which is illuminated by the optical system. The reason for placing the photo-electric cell so that it subtends a large angle from the record is that the walls of the enclosure are not perfectly reflecting, and that there are two dark areas in the enclosure besides the photo-electric cell, one such area being the lens of the optical system and the other being the uncovered portion of the record. Since therefore, the amount of absorption in the remainder of the enclosure is not zero, there is some gain in the amount of light entering the photo-electric cell, if the cell is arranged to receive as much direct light from the record as possible, and if the number of reflections required for other light to reach the cell is minimized.

Member 9 as illustrated has a flanged opening which receives the small end 10 of the optical system. It is also shown as completely enclosing the photo-cell, although I may, under certain circumstances, prefer to mount the cell exteriorly of the casing with its window at an opening in the casing. In the side of the casing adjacent the record strip is the opening 11 through which the light beam is projecting on the record and which flares inwardly so as to form a taper of large angle. The interior surface of the casing and the end of the part 10 which enters the casing are made highly reflecting by giving them a white coating, for example by painting them with magnesium carbonate. The casing 9 thus serves to shield the cell from external light or light coming from other sources than the record and to reflect to the cell such light which is reflected from the record but not directly into the cell. Inasmuch as coefficients of reflection of the order of 97% to 98% are obtainable with white surfaces it will be seen that even though the cell window constitutes only about 20% of the exposed wall area it is possible to obtain in the photo-cell approximately 85% to 90% of all the light reflected from the record.

I have chosen the particular embodiment described above as illustrative of my invention and it will be apparent that the same principle is applicable to other devices, for example scanning systems for facsimile and television transmitters. It will be further apparent that various modifications may be made without departing from the spirit and scope of my invention which modifications I aim to cover by the appended claims.

What I claim as new and desire to secure by Letters Patent of the United States is:

1. Apparatus for translating a light reflecting record into current variations comprising a light reflecting casing having an opening adjacent said record, optical means for directing light through said casing in a narrow band on the record and a photo-electric device cooperating with the casing and arranged to receive light reflected from the record independently of said optical means.

2. Apparatus for translating a light reflecting sound record into current variations comprising optical means spaced from the record for focusing light in a narrow band thereon, a photo-electric device adjacent said means arranged to receive the direct reflection from the record, and a casing cooperating with said device and extending between the optical means and the record, said casing being constructed to shield the window of the device from external light and having a diffusely reflecting interior surface.

3. Apparatus for translating a light reflecting sound record into current variations comprising means for movably supporting the record, optical means for focusing a narrow band of light on the record, a photo-electric cell, and an enclosing member between the cell and the record having an interior surface of magnesium carbonate and having an opening adjacent the record constructed to receive substantially all of the light reflected from the record.

In witness whereof, I have hereunto set my hand this 20th day of May, 1930.

EDWARD W. KELLOGG.